Patented July 7, 1936

2,046,871

UNITED STATES PATENT OFFICE 2,046,871

PLASTIC BODY

Werner W. Duecker and Claron R. Payne, Pittsburgh, Pa., assignors to Texas Gulf Sulphur Company, a corporation of Texas No Drawing. Application September 4, 1934, Serial No. 742,642

2 Claims. (Cl. 106—22)

There is a class of plastics, known to industry, that consists of or includes the mutual solution of sulphur and olefine sulphide. Such an article is disclosed in United States Letters Patent No. 1,890,231, granted December 6, 1932, on the application of Joseph C. Patrick and Nathan M. Mnookin; such another article is disclosed in an application for Letters Patent, filed March 22, 1933, by Werner W. Duecker, one of the present applicants, Serial No. 662,113. These plastics are ordinarily quite viscous, the degree of their viscosity being determined by their olefine sulphide content.

We have discovered that by adding to these plastics a halide, an oxide, or a sulphide, of an electro-negative element, the viscosity of the plastic is decreased, and the result is a stable plastic mass. While compounds of the electro-negative element generally are suitable, we have found the best results to be obtained by the use of compounds of arsenic and phosphorus. We give the following typical formulae for the practice of our invention:—

Example 1

75 parts sulphur.
25 parts olefine sulphide.
0.125 to 2.5 parts phosphorus sulphide.
Heat 1 to 4 hours to 140° C.
Result: a plastic mass of reduced viscosity.

Example 2

75 parts sulphur.
25 parts olefine sulphide.
0.125 parts phosphorous sulphide.
1.25 to 5. parts mercuric chloride.
Heat 1 hour to 140° C.
Result: plastic mass of reduced viscosity.

Example 3

90 parts sulphur.
10 parts olefine sulphide.
0.25 parts phosphorous sulphide.
Heat 1 hour to 140° C.
Result: plastic mass of reduced viscosity.

Olefine sulphides alone may be treated with phosphorus sulphide and changed from an elastic to a plastic mass of reduced viscosity.

Mixtures of olefine sulphides and sulhpur are viscous and therefore difficult to use as impregnating substances. By treating them in the manner indicated their viscosity is reduced and they can be used as saturants of porous materials.

The plastic masses either alone or together with a filler or aggregate may be used as lutes, cements, or protective covering for metals, etc.

We claim as our invention:

1. A plastic body consisting of a mutual solution of sulphur and olefine sulphide in association with a substance of a group consisting of the halides, the oxides, and the sulphides of arsenic and phosphorous.

2. The method herein described of reducing the viscosity of a mutual solution of sulphur and olefine sulphide, which consists in heating such a solution, together with a halide, oxide, or sulphide, of arsenic or phosphorous.

WERNER W. DUECKER.
CLARON R. PAYNE.